INVENTOR.
JAMES CUFFEY
BY
Lockwood, Woodard, Smith & Weikart
Attorneys

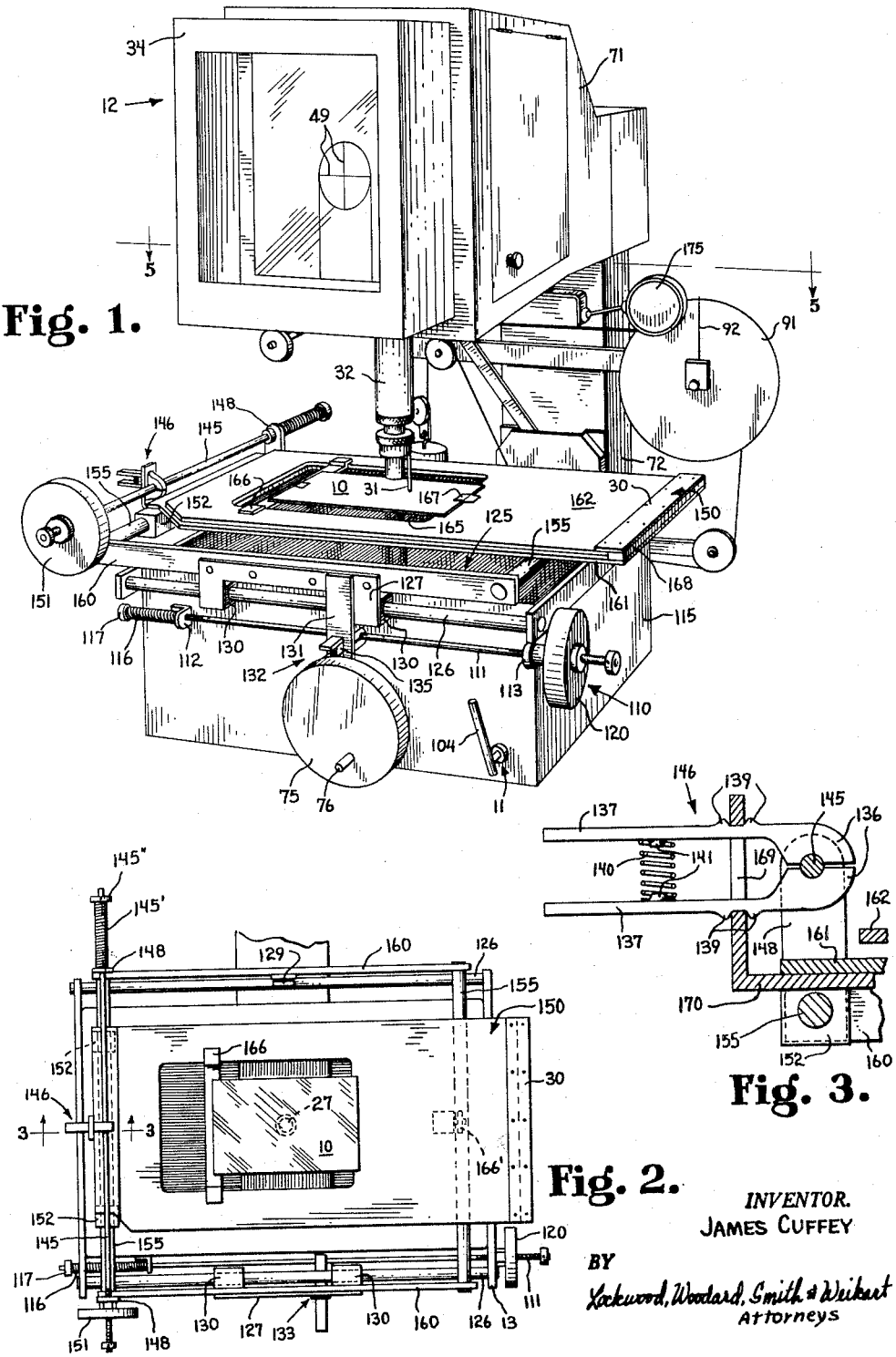

United States Patent Office 3,186,295
Patented June 1, 1965

3,186,295
IRIS PHOTOGRAPHIC PHOTOMETER
James Cuffey, 522 East Side Drive, Bloomington, Ind.
Filed Apr. 10, 1961, Ser. No. 101,870
6 Claims. (Cl. 88—14)

The present invention relates to an iris photographic photometer which may also find utility as a densitometer for measuring density or degree of transparency of an object, the invention also relating to certain subcombinations of the device.

Photometers are known in the field of astronomy and are used to determine the brightness or intensity of a given star. The photographic image of a bright star as captured by means of a telescope having a camera combined therewith results in a photographic image of the star which is many times as large as the visual image produced by the same telescope. It appears at first glance that this fact would be a serious drawback to the use of star photographs because the resolving power of the photograph is limited. It has been found, however, that the various sizes of the star images as determined by their brightness is a valuable tool for determining the star's brightness because a simple measure of the diameter of the image on a photographic plate provides the desired information. Obviously, accuracy in measuring the diameter of the image is extremely important.

Therefore, one object of the present invention is to provide a photometer which is capable of great accuracy but is relatively inexpensive to manufacture.

A general object of the invention is to provide an improved photometer or densitometer.

Another object of the present invention is to provide an improved device for measuring transparency or opaqueness of an object.

Still another object of the invention is to provide an improved photometer having convenient and easily operated means for locating for measurement a desired star in a group of stars on a photographic plate and thus greatly reducing the time necessary to measure the intensity or brightness of the star or of a group of stars.

Still another object of the present invention is to provide an adjusting and indicating means for use with an iris or the like, said means being highly accurate, yet inexpensive to manufacture.

In general, the present device comprises a light source and a chopper arranged to alternately permit passage of one or the other of a pair of spaced beams of light. There is also provided means for channeling light from the light source to the chopper to form one of the beams and also means for channeling light from the light source through an adjustable iris and thence through an object, the transparency of which is to be measured. There is further provided means for channeling light from the object to form the other of said beams. The device also includes a photoelectric cell positioned to alternately sense said beams as they pass through the chopper, and an oscilloscope operatively connected to the photoelectric cell for comparing the intensity of the beams.

The full nature of the invention will be understood from the accompanying drawings and the following description and claims.

FIG. 1 is a perspective view of an iris photographic photometer constructed according to the present invention.

FIG. 2 is a horizontal plan view looking downwardly upon the plate area of the structure of FIG. 1.

FIG. 3 is an enlarged vertical section taken along the line 3—3 of FIG. 2 in the direction of the arrow.

Figure 4:
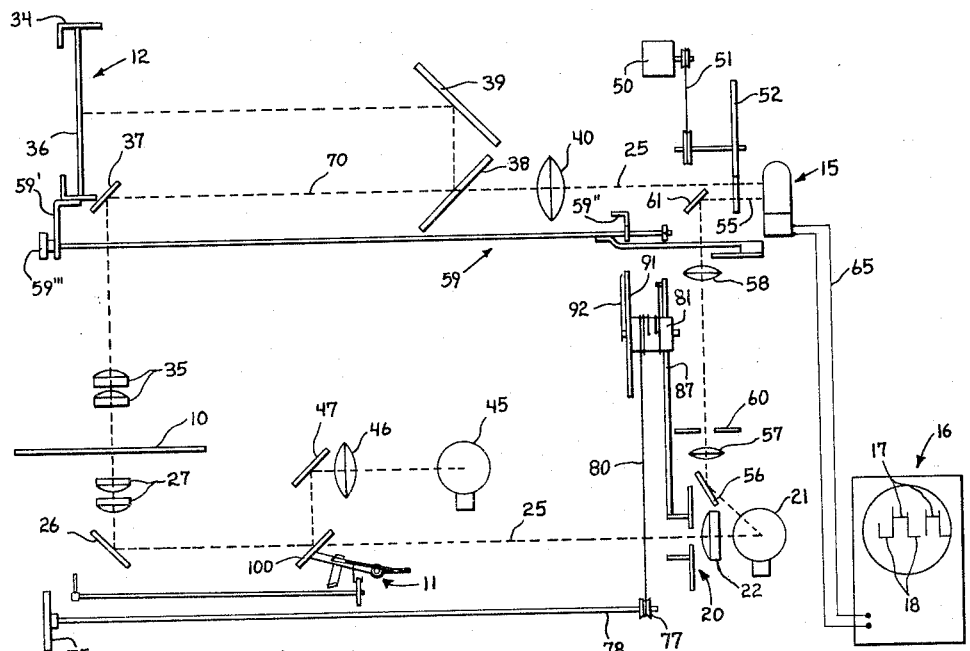
FIG. 4 is a schematic view of the photometer of FIG. 1 indicating the operation thereof.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings and primarily to FIGS. 1 and 4, the present device is intended to receive a photographic negative in the form of a plate 10, this negative being a picture of a given portion of the sky and including, of course, a number of spots of varying diameter which represent the stars and various other astronomical phenomena. The present apparatus includes an adjustable reflecting and blocking device indicated generally by the numeral 11 (FIGS. 1, 4 and 8) which permits illumination of a substantial portion of the photographic negative and the throwing of an image thereof upon a viewing screen indicated generally by the numeral 12. In a manner to be described below, a particular star may be selected from the image thrown on the screen for measurement to determine the size of the spot produced on the photographic plate by the star and thus to give an indication of the brightness thereof.

This measurement is accomplished by comparing the amount of light or the portion of a light beam which the star spot passes with a standard beam, both of these amounts of light or beams being alternately thrown upon a photoelectric cell 15 and then measured by means of a cathode ray oscilloscope 16. The information thrown on the screen of the oscilloscope represents at 17 the amount of light which the star passes and at 18 the intensity of the standard beam of light.

In order to measure the intensity of the star spot, the amount of light going to the photographic plate is varied by means of an iris indicated generally by the numeral 20 (FIGS. 4, 5 and 6) and the lines 17 and 18 are brought into null balance by adjustment of this iris. It can be appreciated that because of the straight line nature of the information 17 and 18 on the oscilloscope screen, the determination of the null balance is relatively easy because the lines 17 and 18 need merely be brought into alignment. As is explained below, the adjustable iris is provided with an indicator from which may be determined the intensity of the star.

Referring more particularly to FIG. 4, the device is provided with a light source 21 and with a collimating lens which acts upon the beam from the source 21 prior to its passing through the iris 20. The iris, itself, is conventional and might be, for example, an eleven-leaved No. 47 Dellmeyer Iris manufactured by the Company of the same name in London, England. As will appear below, the adjustment and reading of this iris is not conventional; however, the function of the iris is to pass therethrough a generally circular amount of light which can be varied by changing the size of the iris and the amount of variation measured accurately as will be described.

Figures 6, 8:
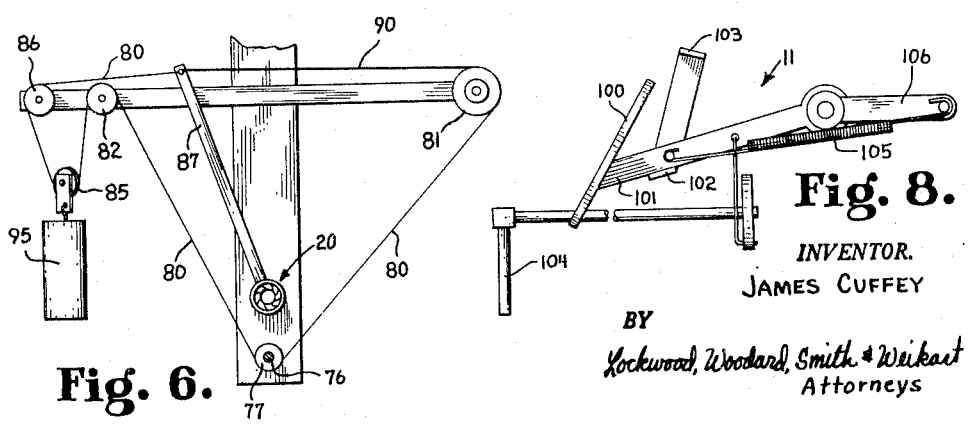
FIG. 6 is a front elevation of the structure of FIG. 5.
FIG. 8 is a detail view of a means for illuminating the field and alternatively measuring a particular star, said means forming a part of the device of the present invention.

This light from the iris passes along the path 25 past the reflecting and blocking device 11, which should be arranged in its lowermost position as illustrated in FIG. 8, the light beam continuing on path 25 until it strikes a mirror 26 which reflects this light through objective lenses 27 to form an image of the iris at the upper surface of the plate 10. It should be mentioned that the upper surface of the plate 10 is maintained in a given position by means of a spring hinge 30 which holds the plate against a fixed projection 31 extending downwardly from the objective housing 32 of the device. Thus, the upper surface of the photographic negative plate 10 will be located precisely at the focus of the iris image.

The housing 32 contains objective lenses 35 which are suitably arranged to form an image upon the viewing screen 12 and particularly at the vertically extending plane portion 36 thereof, this plane portion being shaded by a shadow box 34. The light passing through the objective lenses 35 is reflected by mirrors 37, 38 and 39 until it strikes the plate 36 of the screen. It should be mentioned that the mirror 38 is transparent and therefore, a given portion of the light from the objectives 35 passes therethrough and through a field lens 40 which focuses the light upon the cathode of the photoelectric cell 15.

The device also includes a field illuminating light source 45, the light from which passes through a collimating lens 46 and is reflected from a mirror 47. Depending upon the position of the adjustable reflecting and blocking device 11, this light is reflected against the mirror 26 and through the objective lens 27 to illuminate a substantial area of the particular photographic negative being examined and to throw an image thereof upon the plate portion 36 of the viewing screen 12. The crosshairs or perpendicular lines 49 fixed in place at the viewing screen 12 indicate the exact point at which the center of the measuring beam 25 will be located when the adjustable device 11 is suitably manipulated for measurement of the star. Thus, the operator of the present device can, by illuminating the field, accurately locate a star to be measured within a large group of stars and then can quickly throw the reflecting and blocking device 11 to its other position for measuring the star.

Figures 5, 7:
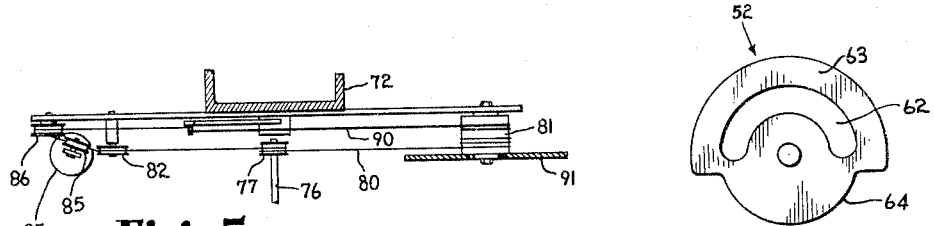
FIG. 5 is a horizontal section taken along the line 5—5 of FIG. 1 showing the details of the adjustable iris of the present invention.
FIG. 7 is a front view of the chopper forming a part of the present invention.

At 50, there is provided a conventional electric motor which drives through suitable pulleys and belt 51 a chopper 52 which is shown in plan view in FIG. 7. As can be determined from an inspection of FIG. 4, the beam 25 from the source 21 passes above a beam 55 which is produced by the same light source 21 reflecting its light against a fixed mirror 56 and through collimating lens 57 and objective lens 58 which system throws an image of a fixed aperture 60 upon the cathodes of the photoelectric cell by reflection against mirror 61.

The advantage of the particular arrangement illustrated is that whenever the light source 21 decreases or increases in intensity, a corresponding increase or decrease is produced in both the measuring beam 25 and the standard beam 55 and thus, such changes in intensity do not affect the measurement being carried out. It should be mentioned that the intensity of the standard beam can be adjusted by the adjustable stop 59 which is slidably mounted on brackets 59' and 59" and is operated by handle 59'''.

As mentioned, the standard beam 55 is below the measurement beam 25 and thus, when the portion 64 of the chopper is downward, the light of the beam 55 can pass thereby to actuate the photoelectric cell 15. When the semi-circular aperture 62 of the chopper is downward, the portion 63 of the chopper blocks the standard beam but passage through the aperture 62 is permitted of the beam 25 to actuate the photoelectric cell. It can be appreciated that approximately half the time the photoelectric cell will receive the measurement beam and the other half of the time, it will receive the standard beam and that these changes will occur at predetermined equal intervals of time depending upon the speed of rotation of the chopper.

The photoelectric cell 15 may be for example, a IP21 tube and is operatively connected in conventional manner to a voltage source and as indicated at 65 to the vertical input of the oscilloscope. Thus, differences in intensity of the beams 25 and 55 will be reflected in the positions of the pattern 17 and 18 on the screen of the oscilloscope. As is well known, the oscilloscope is provided with a synchronous or holding circuit which retains the proper pattern on the screen of the oscilloscope even though the motor 50 may not maintain the exact proper speed which corresponds to the theoretical horizontal sweep of the oscilloscope. In other words, the horizontal sweep speed will vary to synchronize itself with the speed of the motor 50, this being accomplished by forming the chopper in such a manner as to produce short dark periods on the photo cell 15 in between each beam. These dark periods produce peaks which actuate the holding circuit.

It should be noted that even though the present device is used in a room wherein a moderate amount of light is present, the operation of the device is not hindered or affected. This is accomplished by shielding the various portions of the path of the measuring beam 25 and of the standard beam 55 as they pass to the photoelectric cell and also shielding the photoelectric cell itself. Thus, the light passing into the lower objective lens 27 is shielded by a housing similar to the housing 32 and the light passing through the objectives 35 is, of course, shielded by housing 32. The portion 70 of the beam 25 passes through the container 71 which mounts the viewing screen 12 and which prevents passage of outside light to the photoelectric cell at any point along the length of housing 71.

The light beam 55 passes from the light source 21 into a vertically extending container 72 (formed by two welded together channels) which also provides a mounting for the container 71 and the motor 50, the photoelectric cell 15 and the chopper 52 as well as, of course, the viewing screen 12.

As mentioned, the details of the iris adjustment are particularly important to the precise accuracy desired for the present device. This iris adjustment includes a wheel 75 having a knob 76 which is easily accessible on the forward portion of the photometer. Connected to this wheel is a shaft 78 and a pulley 77 mounted on the end thereof. Wrapped around this pulley is a flexible line 80 which is preferably composed of flexible silk fishline material.

One portion of this line 80 extends to and about a relatively large threaded drum 81, the line 80 being received in the threads of the drum and also being fixed to the drum. The other end portion of the line 80 extends over a fixed pulley 82 under a weighted pulley 85 and over a still further fixed pulley 86 to a relatively long adjustment arm 87 secured to the iris 20. The arm 87 also has secured thereto a line 90 which is capable of maintaining a constant length and may be formed of piano wire or the like and which extends for a number of turns about and is fixed to the threaded drum 81, the line 90 being received in the threads thereof.

The drum 81 has secured thereto a scale 91 which is circular in form and cooperates with a vertically extending indicator 92 to show the amount of opening of the iris, the indicator 92 being fixed in position in any suitable manner. Because of the fact that the piano wire 90 is of constant length, the position of the iris is always accurately indicated by the position of the drum 81. Of course, constant length material such as piano wire does not easily wrap about small, inexpensive easily manipulated pulleys such as 77, 82, 86 and 85 which are smaller in diameter than the drum 81. However, constant length maintenance of the flexible line 80 is not critical and does not have any bearing upon the relative positions of the iris and the indicator scale assembly 91 and 92. The weight 95 which hangs upon the pulley 85 always maintains a constant force on the piano wire 90 and thus, further insures extreme accuracy of measurement and indication.

The device 11 for alternately throwing an image of the negative upon the screen or for measuring a given star includes an opaque mirror 100 which is mounted upon a pivotal arm 101, the movement of this arm being limited by stops 102 and 103 fixed relative to the device. When the handle 104 at the forward portion of the device is thrown one way or the other, a toggle arrangement maintains the arm 101 against either the stop 102 or 103, this toggle arrangement including a spring 105 secured to the arm 101 and to the extending end of an arm 106 fixed with relation to the stops 102 and 103. As has been suggested above, when the device 11 is thrown against the stop 103, the field is illuminated and when thrown against stop 103, the star intensity can be measured.

The device also includes a fast motion and a slow motion in both X and Y directions for rapidly positioning the photographic plate 10 with the cross-hairs 49 intersecting at the precise center of the image of the star to be measured. The X motion 110 comprises a shaft 111 which extends through a bracket 112 and a bracket 113 both of which are fixed to the base portion 115 of the device. Received upon the extending end of the shaft 111 is a spring 116 which acts between a cap 117 secured to the shaft and the bracket 112 and tends to urge the shaft 111 leftwardly is viewed in FIG. 1. The shaft 111 is threaded at its opposite end and receives thereon an adjustment knob 120 which may be rotated to move the shaft slowly either leftwardly or rightwardly.

The X carriage 125 is slidable leftwardly and rightwardly upon a pair of bars 126 which also extend leftwardly and rightwardly and are fixed to the base portion 115. The X carriage includes a mounting element 127 which is fixed to the carriage itself and which includes slideable blocks 130 received on the forward bar 126. The X carriage is also provided with a wheel 129 which rides on the rearward bar 126. The mounting element 127 has fixed thereto a bar 131 having a clamp 132 received through an aperture 135 in the bar 131. The clamp 136 is identical to the clamp 146 of FIG. 3 and will be described in connection therewith.

This clamp 132 holds the shaft 111 in fixed relation to the X carriage except when the clamping jaws 136 are separated by squeezing the arms 137 in which case the X carriage may be rapidly moved leftwardly or rightwardly, irregardless of the position of the shaft 111, to provide a fast X motion. It can be seen that a spring 140 is received between the arms 137 and upon protuberances 141 to normally maintain the paws 136 in firm engagement with the shaft 111. The jaws are also provided with spaced protuberances 139 which lock the clamp in position in the aperture 135. These protuberances extend transversely of the arms 137 to prevent tilting or canting of the clamp 132 in the aperture 135.

The Y motion includes, similarly to the X motion, a shaft 145 and a clamp 146 identical as mentioned to the clamp 132. The clamp 146 normally holds the plate support arrangement 150 in fixed relation to the shaft 145. Similarly to the slow motion X adjustment, a slow motion Y adjustment of the plate support 150 may be achieved by rotating the knob 151 threadedly received upon the shaft 145 and thus moving the plate support in the Y direction with relation to the X carriage upon which the plate support is mounted, the shaft 145, spring 145' and cap 145" being identical to the above described parts 111, 116, and 117 and suitable mounting brackets 148 slidably mounting the shaft 145 upon the X carriage also being provided. The plate support 50 includes blocks 152 which are fixed with relation to the plate support and are slidable upon shafts 155 forming a part of the X carriage.

It will be obvious from the above description that the bars 155 are fixed to bars 160 and that these bars 155 and 160 make up the basic rectangular structure of the X carriage upon which the mounting device 127 is rigidly mounted and the wheel 129 is rotatably mounted. The plate support 150 further includes two parallel sheets or plates 161 and 162 of aluminum or the like each having a central opening 165 over which the plate 10 is mounted. Secured to the lower surface of the plate 161 is a roller 166' which travels on the rightward bar 155 (as viewed in FIGS. 1 and 2) when the blocks 152 slide on the leftward bar 155.

As mentioned above, the hinge spring 30 maintains the plate 10 against the projection 31 so that the plate is located precisely at the focus of the image of iris 20. The plate 10 rests upon the plate 162 and the bar 166 supported on the plate 162, the plate 10 being secured in place by the tape 167 and by any further tape deemed necessary. The spring 30 extends completely across the width of the plate 162 and connects the plate 162 to the similarly extending block or bar 168 which is fixed to the plate 161. Referring to FIG. 3, the details of mounting of the clamp 146 in the recess 169 in the bracket 170 are clearly shown, the bracket 170 being fixed to the lower surface of the plate 161.

A typical measurement consists of the following operations: The reflecting and blocking device 11 is moved by its operating handle 104 to the position of FIG. 4 causing a substantial portion of the photographic plate 10 to be illuminated and an image thereof thrown on the viewing screen 12. By operation of the fast motion clamps 132 and 146 and by operation of the slow motion adjusting knobs 120 and 151, the plate support 150 and the plate 10 are moved in the X and Y directions until the desired star to be measured has its center located at the precise intersection of the perpendicular lines or cross-hairs 49 of the viewing screen. The lever 104 is then operated to shift the reflecting and blocking device 11 to the position of FIG. 8 thus canceling the field illumination and throwing the image of the iris 20 about the star image at the plate 10.

Next, the fine or slow motions in the X and Y direction are used to carefully center the star in the center of the image of the iris. The iris control knob 76 and wheel 75 is then rotated until the oscilloscope 16 indicates that the intensity of the light beams 25 and 55 are equal, this equality being evident by the alignment of the portions 17 and 18 of the pattern on the face of the oscilloscope. The position of the indicator 92 with relation to the scale 91 is then read to provide a comparative indication of the intensity of the star. The scale 91 can be calibrated by comparing with the intensity of standard or known stars.

It has been found that by the use of the present invention and with practice, over one hundred stars an hour can be measured without difficulty. If desired, an automatic switch may be operated by the throwing of the handle 104 to change the device 11 between the measuring and field illumination positions, this switch acting to automatically turn on a light illuminating the iris indicator scale 91. The apparatus may also be provded with a magnifying glass 175 to facilitate reading of the relative position of the indicator 92 and scale 91.

From the above description, it will be obvious that the present invention provides a photometer which is capable of great accuracy, is easy to operate, can be rapidly operated and is relatively inexpensive to manufacture. It will also be evident that the improved photometer of the present invention includes convenient and easily operated means for locating and positioning for measurement a desired star in a group of stars on a photographic plate whereby the time necessary to measure the intensity or brightness of the star or of a group of stars is greatly reduced. It will also be obvious that the present invention provides an adjusting and indicating device for use with an iris or a similar apparatus, said device being highly accurate, yet inexpensive to manufacture.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A measuring device comprising a first light source, a chopper arranged to alternately permit passage of one or the other of a pair of spaced beams of light, means for channeling light from said light source to said chopper to form one of said beams, an adjustable iris, means for channeling light from said light source through said adjustable iris, thence through an object the transparency of which is to be measured, means for channeling the light from the object to form the other of said beams, a photoelectric cell positioned to sense said beams after they pass through said chopper, and an oscilloscope connected to said photoelectric cell for comparing the intensity of said beams, a second light source, said latter two channeling means being operable to conduct light from said second source through the object to illuminate a broader area of said object than the first light source, an opaque mirror pivotal between two positions in a first of which said mirror blocks light from said first light source but reflects light from said second light source into said channeling means, the second position of said opaque mirror being such that light from said first light source is not blocked thereby and light from said second light source is not reflected into said channeling means thereby, toggle means for resiliently holding said opaque mirror in each of said positions, a viewing screen, and a transparent mirror for reflecting a portion of the light passing through said object onto said viewing screen.

2. A measuring device comprising a light source, means for alternately permitting passage of one or the other of a pair of beams of light, means for channeling light from said light source to said first means to form one of said beams, an adjustable opening, means for channeling light from said light source through said adjustable opening, thence through an object the transparency of which is to be measured, means for channeling the light from the object to form the other of said beams, means for sensing the intensity of said beams after they pass through said first means, means for comparing the sensed intensity, a second light source, said latter two channeling means being operable to conduct light from said second source through the object to illuminate a broader area of said object than the first light source, an opaque mirror pivotal between two positions in a first of which said mirror blocks light from said first light source but reflects light from said second light source into said channeling means, the second position of said opaque mirror being such that light from said first light source is not blocked thereby and light from said second light source is not reflected into said channeling means thereby, toggle means for resiliently holding said opaque mirror in each of said positions, a viewing screen, and a transparent mirror for reflecting a portion of the light passing through said object onto said viewing screen.

3. A measuring device comprising a light source, a chopper arranged to alternately permit passage of one or the other of a pair of spaced beams of light, means for channeling light from said light source to said chopper to form one of said beams, an adjustable iris, means for channeling light from said light source through said adjustable iris, thence through an object the transparency of which is to be measured, means for channeling the light from the object to form the other of said beams, a photoelectric cell positioned to sense said beams after they pass through said chopper, and an oscilloscope connected to said photoelectric cell for comparing the intensity of said beams, a control lever projecting from said iris, a scale element and indicator element rotatable with respect to one another, a threaded drum fixed to one of said elements and coaxial therewith for rotation therewith, a constant length line secured at one end to said drum for wrapping thereabout in the threads thereof and secured at the other end to the control lever, a flexible line secured to said drum for wrapping thereabout, a pair of fixed pulleys, a weighted movable pulley, a further fixed pulley rotatable to adjust said iris, said flexible line passing from said drum about said further pulley over one fixed pulley under the weighted pulley over the other fixed pulley and to attachment with the control lever, said constant length line and said flexible line extending oppositely from said control lever.

4. A measuring device comprising a light source, means for alternately permitting passage of one or the other of a pair of beams of light, means for channeling light from said light source to said first means to form one of said beams, an adjustable iris, means for channeling light from said light source through said adjustable opening, thence through an object the transparency of which is to be measured, means for channeling the light from the object to form the other of said beams, means for sensing the intensity of said beams after they pass through said first means and means for comparing the sensed intensity, a control lever projecting from said iris, a scale element and an indicator element rotatable with respect to one another, a threaded drum fixed to one of said elements for rotation therewith, a constant length line secured at one end to said drum for wrapping thereabout in the threads thereof and secured at the other end to the control lever, means for rotating said drum, and means for maintaining a tension of relatively constant magnitude on said line.

5. A measuring device comprising means for alternately permitting passage of one or the other of a pair of spaced beams of light, means for channeling light to said first means to form one of said beams, an adjustable iris, means for channeling light through said adjustable iris against an object to be measured, means for channeling the light from the object to form the other of said beams, means for sensing the intensity of said beams after they pass through said first means, means for comparing the sensed intensity, a control lever projecting from said iris, a scale element and an indicator element rotatable with respect to one another, a threaded drum fixed to one of said elements for rotation therewith, a constant length line secured at one end to said drum for wrapping thereabout in the threads thereof and secured at the other end to the control lever, means for rotating said drum, and means for maintaining a tension of relatively constant magnitude on said line.

6. A measuring device comprising a base, a light source fixed with relation to said base, a chopper rotatably mounted on said base and arranged to alternately permit passage of one or the other of a pair of spaced beams of light, means mounted on said base for channeling light from said light source to said chopper to form one of said beams, an adjustable iris mounted on said base, means mounted on said base for channeling light from said light source through said adjustable iris thence through a plate-like object the transparency of which is to be measured, means fixed with relation to said base for channeling the light from the object to form the other of said beams, a photoelectric cell fixed with relation to said base and positioned to sense said beams after they pass through said chopper, and an oscilloscope connected to said photoelectric cell for comparing the intensity of said beams, a support for the object, a pair of parallel rods secured to said base, a carriage slidably mounted on one of said parallel rods, said rods extending parallel to the plane of said object, said support being adjustably mounted on said carriage for movement in the plane of said object, said carriage having a wheel rotatably mounted thereon and positioned to roll on the other of said parallel rods, a shaft slidably mounted on said base and extending parallel to said rods, a spring acting between said base and said rod and urging said rod longitudinally thereof, a knob threadedly received on said shaft and limiting longitudinal movement thereof, said knob being rotatable to slowly move the shaft longitudinally, a clamp mounted on the carriage and having clamping jaws resiliently engaging the shaft to fix the position of said carriage relative to said shaft.

References Cited by the Examiner
UNITED STATES PATENTS

| | | | |
|---|---|---|---|
| 2,485,089 | 10/49 | Fassin | 88—61 |
| 2,592,264 | 4/52 | Fultz | 88—14 |
| 2,680,990 | 6/54 | Sweet | 88—14 |
| 2,748,649 | 6/56 | Orlando | 88—14 |
| 2,780,105 | 2/57 | Steiner et al. | 74—10.7 |
| 2,795,170 | 6/57 | Hansen et al. | 88—61 |
| 2,844,039 | 7/58 | Spakman | 74—10.7 |
| 2,905,427 | 9/59 | Roeder | 248—346 |
| 3,002,421 | 10/61 | Konlicovitch | 88—24 |

DAVID H. RUBIN, *Primary Examiner.*